US012517445B2

(12) United States Patent
Qi et al.

(10) Patent No.: US 12,517,445 B2
(45) Date of Patent: Jan. 6, 2026

(54) TONER COMPRISING CHARGE CONTROL AGENT

(71) Applicant: Xerox Corporation, Norwalk, CT (US)

(72) Inventors: Genggeng Qi, Webster, NY (US); Jordan A. Frank, Rochester, NY (US); Elizabeth K. Priebe, Rochester, NY (US); Chieh-Min Cheng, Rochester, NY (US); Michael F. Zona, Hickory, NC (US)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 17/697,783

(22) Filed: Mar. 17, 2022

(65) Prior Publication Data

US 2023/0324824 A1 Oct. 12, 2023

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 9/093*** | (2006.01) |

(52) U.S. Cl.

CPC ......... *G03G 9/09758* (2013.01); *G03G 9/081* (2013.01); *G03G 9/08755* (2013.01); *G03G 9/09328* (2013.01); *G03G 9/09371* (2013.01); *G03G 9/09725* (2013.01)

(58) Field of Classification Search

CPC ............... G03G 9/09758; G03G 9/081; G03G 9/08755; G03G 9/09328; G03G 9/09371; G03G 9/09725

See application file for complete search history.

(56) References Cited

U.S. PATENT DOCUMENTS

| | | | |
|---|---|---|---|
| 3,681,106 | A | 8/1972 | Burns |
| 3,847,604 | A | 11/1974 | Hagenbach |
| 4,298,672 | A | 11/1981 | Lu |
| 4,338,390 | A | 7/1982 | Lu |
| 4,533,614 | A | 8/1985 | Fukumoto |
| 4,845,006 | A | 7/1989 | Matsubara |
| 4,863,824 | A | 9/1989 | Uchida |
| 4,863,825 | A | 9/1989 | Yoshimoto |
| 4,917,983 | A | 4/1990 | Uchida |
| 4,931,370 | A | 6/1990 | Amaya |
| 4,933,252 | A | 6/1990 | Nishikawa |

(Continued)

FOREIGN PATENT DOCUMENTS

| | | |
|---|---|---|
| EP | 1253476 | 10/2002 |

OTHER PUBLICATIONS

JP2001296700, Published Oct. 26, 2001, Google Patent Translation.

(Continued)

*Primary Examiner* — Mark F. Huff
*Assistant Examiner* — Boone Alexander Evans
(74) *Attorney, Agent, or Firm* — Marylou J. Lavoie, Esq.

(57) ABSTRACT

An emulsion aggregation toner including a toner particle comprising at least one resin; an optional colorant; an optional wax; and a charge control agent disposed on a surface of the toner particle; the charge control agent comprising a complex formed from a metal ion donor and at least one of a ligand selected from a member of the group consisting of a polyaromatic acid comprising humic acid, a pyranone based ligand, a furanone based ligand, or a combination thereof.

23 Claims, 4 Drawing Sheets

(56) References Cited

U.S. PATENT DOCUMENTS

| | | | | |
|---|---|---|---|---|
| 4,935,326 | A | 6/1990 | Creatura | |
| 4,937,166 | A | 6/1990 | Creatura | |
| 4,957,774 | A | 9/1990 | Doi | |
| 4,973,539 | A | 11/1990 | Sacripante | |
| 4,980,448 | A | 12/1990 | Tajiri | |
| 4,981,939 | A | 1/1991 | Matsumura | |
| 4,988,794 | A | 1/1991 | Kubo | |
| 5,057,596 | A | 10/1991 | Kubo | |
| 5,143,809 | A | 9/1992 | Kaneko | |
| 5,227,460 | A | 7/1993 | Mahabadi | |
| 5,236,629 | A | 8/1993 | Mahabadi | |
| 5,330,874 | A | 7/1994 | Vahabadi | |
| 5,376,494 | A | 12/1994 | Mahabadi | |
| 5,480,756 | A | 1/1996 | Mahabadi | |
| 5,500,324 | A | 3/1996 | Mahabadi | |
| 5,578,407 | A * | 11/1996 | Kasuya | G03G 9/0906 430/108.8 |
| 5,601,960 | A | 2/1997 | Mahabadi | |
| 5,629,121 | A | 5/1997 | Nakayama | |
| 5,650,484 | A | 7/1997 | Hawkins | |
| 5,750,909 | A | 5/1998 | Hawkins | |
| 6,063,827 | A | 5/2000 | Sacripante | |
| 6,326,119 | B1 | 12/2001 | Hollenbaugh | |
| 6,358,657 | B1 | 3/2002 | Silence | |
| 6,359,105 | B1 | 3/2002 | Ianni | |
| 6,592,913 | B2 | 7/2003 | Cook | |
| 6,593,053 | B1 | 7/2003 | Chang | |
| 7,329,476 | B2 | 2/2008 | Sacripante | |
| 2003/0162018 | A1 | 8/2003 | Takuya et al. | |
| 2006/0216626 | A1 | 9/2006 | Sacripante | |
| 2008/0107990 | A1 | 5/2008 | Field | |
| 2008/0236446 | A1 | 10/2008 | Zhou | |
| 2009/0047593 | A1 | 2/2009 | Vanbesien et al. | |
| 2009/0202931 | A1 * | 8/2009 | Lincoln | G03G 9/08797 430/108.4 |
| 2011/0207044 | A1 | 8/2011 | Zwartz et al. | |
| 2015/0072283 | A1 | 3/2015 | Marcell et al. | |
| 2017/0090324 | A1 | 3/2017 | Kadonome et al. | |

OTHER PUBLICATIONS

JP2012189698, Published Oct. 4, 2012, Google Patent Translation.

Extended European Search Report, Dated Jul. 4, 2023, Application No. 23158741.1-1107.

Jordan A. Frank, U.S. Appl. No. 17/697,800, filed Mar. 17, 2022, “Toner Comprising Charge Control Agent,” not yet published.

Jordan A. Frank, U.S. Appl. No. 17/697,809, filed Mar. 17, 2022, “Toner Comprising Reactive Charge Control Agent,” not yet published.

* cited by examiner

TONER COMPRISING CHARGE CONTROL AGENT

RELATED APPLICATIONS

Commonly assigned U.S. patent application Ser. No. 17/697,800, entitled "Toner Comprising Charge Control Agent"), filed concurrently herewith, which is hereby incorporated by reference herein in its entirety, describes an emulsion aggregation toner comprising: a toner particle comprising at least one resin; an optional colorant; an optional wax; and a charge control agent disposed on a surface of the toner particle; the charge control agent comprising a phenyl siloxane; and a complex formed from a metal ion donor and at least one of a ligand selected from a member of the group consisting of a polyaromatic acid comprising humic acid, a pyranone based ligand, a furanone based ligand, or a combination thereof.

Commonly assigned U.S. patent application Ser. No. 17/697,809, entitled "Toner Comprising Reactive Charge Control Agent", filed concurrently herewith, which is hereby incorporated by reference herein in its entirety, describes an emulsion aggregation toner comprising: a toner particle comprising at least one resin; an optional colorant; an optional wax; and a reactive charge control agent disposed on a surface of the toner particle; wherein the reactive charge control agent comprises at least one positive charging compound, wherein the at least one positive charging compound comprises a member selected from the group consisting of an amine compound having at least 3 carbon atoms, an ammonium compound having at least 3 carbon atoms, a phosphonium compound having at least 3 carbon atoms, a boronium compound having at least 3 carbon atoms, and combinations thereof; at least one reactive anchoring compound, wherein the at least one reactive anchoring compound comprises a member selected the group consisting of amino, epoxy, carboxylic, hydroxyl, silanol, cyanide, anhydride, aldehyde, ketone, vinyl, and combinations thereof; and wherein the charge control agent optionally further comprises a negative charging compound, wherein the negative charging compound comprises a member selected from the group consisting of aromatic carboxylic acid, silanol, phenol, pyranone, furanone, and combinations thereof.

BACKGROUND

Disclosed herein is an emulsion aggregation toner comprising: a toner particle comprising at least one resin; an optional colorant; an optional wax; and a charge control agent disposed on a surface of the toner particle; the charge control agent comprising a complex formed from a metal ion donor and at least one of a ligand selected from a member of the group consisting of a polyaromatic acid comprising humic acid, a pyranone based ligand, a furanone based ligand, or a combination thereof.

Also disclosed is a developer comprising: an emulsion aggregation toner particle, and a toner carrier; wherein the emulsion aggregation toner particle comprises: at least one resin; an optional colorant; an optional wax; and a charge control agent disposed on a surface of the toner particle; wherein the charge control agent comprises a complex formed from a metal ion donor and at least one of a ligand selected from a member of the group consisting of a polyaromatic acid comprising humic acid, a pyranone based ligand, a furanone based ligand, or a combination thereof; and optionally, wherein the toner particle further comprises a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

Also disclosed is an emulsion aggregation toner process comprising: obtaining a latex of at least one resin; optionally, obtaining an aqueous dispersion of an optional colorant; optionally, obtaining an aqueous dispersion of an optional wax; forming a mixture of the latex of at least one resin, the aqueous dispersion of the optional colorant, and the aqueous dispersion of the optional wax; heating the mixture to a first temperature; maintaining the first temperature to form aggregated toner particles; adding a latex of shell resin to form a shell over the aggregated particles; optionally, adding a solution of a chelating agent; stopping further aggregation and raising the temperature to a second temperature that is higher than the first temperature to coalesce the aggregated particles; cooling, optionally washing, optionally drying, and recovering the emulsion aggregation toner particles; precipitating a charge control agent onto a surface of the emulsion aggregation toner particles by adding a metal ion donor and at least one of a ligand selected from a member of the group consisting of a polyaromatic acid comprising humic acid, a pyranone based ligand, a furanone based ligand, or a combination thereof, to the emulsion aggregation toner particles, wherein the metal ion donor and polyaromatic acid comprising humic acid ligand, pyranone based ligand, furanone based ligand, or combination thereof, form the charge control agent, forming emulsion aggregation toner particles containing the internal charge control agent; and optionally, disposing a surface additive on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

While the advent of chemically produced toner particles has enabled great improvements in print quality and transfer efficiency over the years, the chemistry involved in the formulation of these particles can create significant interactions within the manufacturing process that can result in poor customer performance. In particular, the chemistry and raw materials used in the emulsion aggregation (EA) process create particles that can suffer in their environmental stability of both charging speed and average charge. In low humidity conditions, typical polyester and/or styrene acrylate particles charge very high and require long mix times with carrier for the charge distributions to become stable and uniform when fresh toner is combined with aged toner in the developer. Conversely, the average charge peak for these particles can be very low in high humidity conditions. This creates challenges in ensuring good print performance in all environmental extremes. In the days of conventional particle processes (extruding/grinding), an internal charge control agent (CCA) was incorporated into the melt mix of the resin to provide improved environmental stability in the final toner. In the EA process, it has been shown to be difficult to incorporate similar charge control agents into the particle without negative effects on the particle process. The suspension polymerization method of particle formulation can incorporate internal CCA in the particle easily with the use of solvents in that process. One method to combat the environmental instability in EA particles is to use titanium dioxide ($TiO_2$) as an external additive in the toner formulation. This additive tends to reduce the average charge and improve the charge speed (admix) in low humidity conditions, without severely impacting the high humidity charging performance, thereby making the environmental stability much better. However, due to $TiO_2$ being deemed a possible health risk to humans, recent regulations have been implemented or are expected with respect to $TiO_2$ such as regulating the amount of $TiO_2$ that can be used in toner formulations, such as to less than 1 percent by weight. In addition, the majority of charge control agents are a complex of a molecular aromatic hydroxycarboxylic acid ligand with a metal ion selected from calcium, zinc, aluminum, iron, chromium atom, boron, zirconium, and titanium. The manufacture and application of these charge control agents result in environmental and health concerns due to high toxicity of the molecular aromatic hydroxycarboxylic acid ligands. It is highly desired to develop a more sustainable charge control agent using alternative less hazardous ligands.

Currently available toners are suitable for their intended purposes. However a need remains for improved toners. Further, a need remains for improved toners, in embodiments, emulsion aggregation toners, that can be prepared with a reduced amount of $TiO_2$, or that can be free of $TiO_2$ altogether, while also providing stable charging performance in all environmental extremes.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an emulsion aggregation toner comprising: a toner particle comprising at least one resin; an optional colorant; an optional wax; and a charge control agent disposed on a surface of the toner particle; the charge control agent comprising a complex formed from a metal ion donor and at least one of a ligand selected from a member of the group consisting of a polyaromatic acid comprising humic acid, a pyranone based ligand, a furanone based ligand, or a combination thereof.

Also described is a developer comprising: an emulsion aggregation toner particle, and a toner carrier; wherein the emulsion aggregation toner particle comprises: at least one resin; an optional colorant; an optional wax; and a charge control agent disposed on a surface of the toner particle; wherein the charge control agent comprises a complex formed from a metal ion donor and at least one of a ligand selected from a member of the group consisting of a polyaromatic acid comprising humic acid, a pyranone based ligand, a furanone based ligand, or a combination thereof; and optionally, wherein the toner particle further comprises a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

Also described is an emulsion aggregation toner process comprising: obtaining a latex of at least one resin; optionally, obtaining an aqueous dispersion of an optional colorant; optionally, obtaining an aqueous dispersion of an optional wax; forming a mixture of the latex of at least one resin, the aqueous dispersion of the optional colorant, and the aqueous dispersion of the optional wax; heating the mixture to a first temperature; maintaining the first temperature to form aggregated toner particles; adding a latex of shell resin to form a shell over the aggregated particles; optionally, adding a solution of a chelating agent; stopping further aggregation and raising the temperature to a second temperature that is higher than the first temperature to coalesce the aggregated particles; cooling, optionally washing, optionally drying, and recovering the emulsion aggregation toner particles; precipitating a charge control agent onto a surface of the emulsion aggregation toner particles by adding a metal ion donor and at least one of a ligand selected from a member of the group consisting of a polyaromatic acid comprising humic acid, a pyranone based ligand, a furanone based ligand, or a combination thereof, to the emulsion aggregation toner particles, wherein the metal ion donor and polyaromatic acid comprising humic acid ligand, pyranone based ligand, furanone based ligand, or combination thereof, form the charge control agent, forming emulsion aggregation toner particles containing the internal charge control agent; and optionally, disposing a surface additive on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

DETAILED DESCRIPTION

Figure 1:
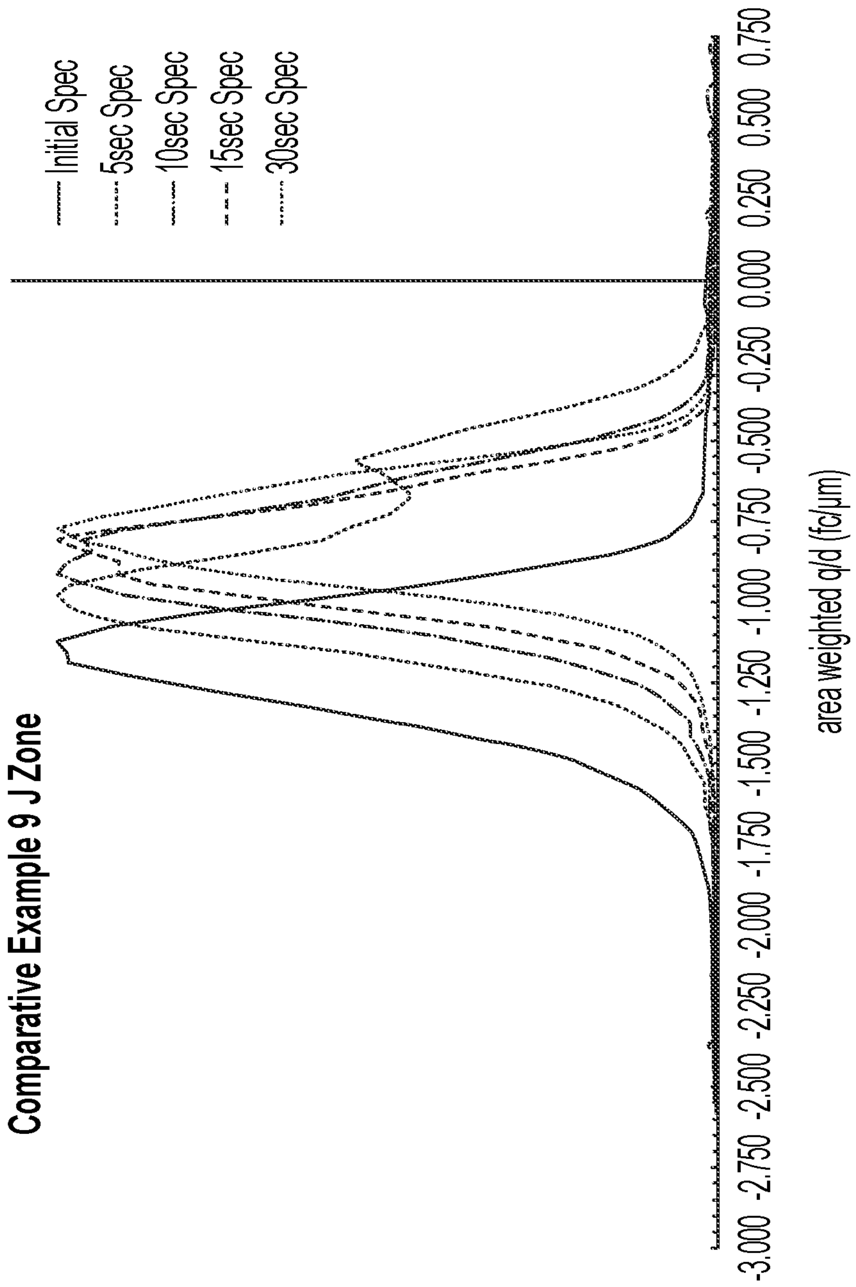
FIG. 1 is a charge spectrograph showing data for comparative particles in low humidity (J zone).

A method of incorporating a charge control agent (CCA) by precipitating CCA molecules onto the surface of a toner particle in the emulsion aggregation (EA) manufacturing process is described. In embodiments, the emulsion aggregation toner process includes forming a latex, aggregating to form aggregated particles, coalescing the aggregated particles, cooling, optionally washing, and optionally drying to prepare emulsion aggregation toner particles. In embodiments herein, the charge control agent is precipitated onto a surface of the emulsion aggregation toner particles after the cooling step. In embodiments, the charge control agent is precipitated onto a surface of the emulsion aggregation toner particles in between the cooling and the washing steps. In other embodiments, the charge control is precipitated onto a surface of the emulsion aggregation toner particles after the drying step. In embodiments, the charge control agent herein is an internal charge control agent. An internal charge control agent as used herein means a charge control agent that is incorporated during the wet portion of the toner process. This is in contrast to external additives which are added to the toner after the toner is dried.

The CCA ligand, for example, dehydroacetic acid or humic acid, contains a motif of aromatic nuclei with phenolic and carboxylic substituents linked together. A metal ion, such as a $Zn^{2+}$ ion or an $Al^{3+}$ ion, is added, and a dehydroacetic acid complex or humic acid complex is formed that can be precipitated onto the surface of the toner particle, in embodiments after cooling but prior to washing and drying, or after drying. In a preferred embodiment, the precipitation process occurs after cooling, washing, and drying via an additional redispersal process. Thus, in embodiments, a process herein comprises forming emulsion aggregation toner particles via aggregation, coalescence, cooling, washing, and drying to obtain dried emulsion aggregation toner particles, redispersing the dried emulsion aggregation toner particles, such as redispersing in water to form a slurry of the emulsion aggregation toner particles, and then precipitating the charge control agent onto the surface of the redispersed emulsion aggregation toner particles. The process enables a charge control agent to be incorporated into the EA process and provide improved charge performance in the form of increased charge speed (admix speed) and improved environmental stability over a wide range in humidity.

In embodiments, an emulsion aggregation toner is described comprising: a toner particle comprising at least one resin; an optional colorant; an optional wax; and a charge control agent disposed on a surface of the toner particle; the charge control agent comprising a complex formed from a metal ion donor and a ligand selected from a member of the group consisting of a polyaromatic acid comprising humic acid, a pyranone based ligand, a furanone based ligand, or a combination thereof.

In further embodiments, a developer is described comprising: an emulsion aggregation toner particle, and a toner carrier; wherein the emulsion aggregation toner particle comprises: at least one resin; an optional colorant; an optional wax; and a charge control agent disposed on a surface of the toner particle; wherein the charge control agent comprises a complex formed from a metal ion donor and a ligand selected from a member of the group consisting of a polyaromatic acid comprising humic acid, a pyranone based ligand, a furanone based ligand, or a combination thereof.

In further embodiments, an emulsion aggregation toner process is described comprising: obtaining a latex of at least one resin; optionally, obtaining an aqueous dispersion of an optional colorant; optionally, obtaining an aqueous dispersion of an optional wax; forming a mixture of the latex of at least one resin, the aqueous dispersion of the optional colorant, and the aqueous dispersion of the optional wax; heating the mixture to a first temperature; maintaining the first temperature to form aggregated toner particles; adding a latex of shell resin to form a shell over the aggregated particles; optionally, adding a solution of a chelating agent; stopping further aggregation and raising the temperature to a second temperature that is higher than the first temperature to coalesce the aggregated particles forming coalesced toner particles; cooling, optionally washing, and optionally drying to form emulsion aggregation toner particles; precipitating a charge control agent onto a surface of the emulsion aggregation toner particles by adding a metal ion donor and at least one of a ligand selected from a member of the group consisting of a polyaromatic acid comprising humic acid, a pyranone based ligand, a furanone based ligand, or a combination thereof, to the emulsion aggregation toner particles, wherein the metal ion donor and humic acid ligand, pyranone based ligand, furanone based ligand, or combination thereof, form the charge control agent, thus forming emulsion aggregation toner particles containing the charge control agent; and optionally, disposing a surface additive on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

The present application provides an emulsion aggregation toner containing a charge control agent. In embodiments, the charge control agent is considered an internal charge control agent. The term "internal charge control agent" is meant to describe a charge control agent that is incorporated during the wet portion of the emulsion aggregation toner process. The internal charge control agent comprises a complex formed from an acid and an ion donor. Together the acid and ion donor form a complex which is precipitated onto the surface of the toner particle during the wet portion of the process, in embodiments, after coalescence In embodiments, the process herein comprises precipitating the charge control agent molecules onto the surface of the particles in the emulsion aggregation toner process after the drying step or in between the cooling and washing steps. In a preferred embodiment, precipitating the charge control agent is performed after cooling, washing, and drying the emulsion aggregation toner particles via an additional redispersal process.

In embodiments, the toner particle comprises a core-shell structure and the charge control agent is disposed on a surface of the toner particle shell. The charge control agent comprises a complex formed from a metal ion donor and a ligand. Any suitable or desired metal ion donor can be selected. In embodiments, the metal ion donor of the charge control agent complex is selected from a member of the group consisting of a divalent calcium ion donor, a divalent magnesium ion donor, a divalent barium ion donor, a divalent zinc ion donor, a trivalent aluminum ion donor, a trivalent iron ion donor, a tetravalent titanium ion donor, a tetravalent zirconium ion donor, and combinations thereof. In certain embodiments, the metal ion donor of the charge control agent complex is selected from a member of the group consisting of a divalent zinc ion donor, a trivalent aluminum ion donor, a tetravalent titanium ion donor, a tetravalent zirconium ion donor, and combinations thereof.

In embodiments, the metal ion donor of the charge control agent complex is selected from a member of the group consisting of zinc nitrate, zinc acetate, zinc sulfate, zinc chloride, aluminum nitrate, aluminum acetate, aluminum sulfate, aluminum chloride, and combinations thereof. In certain embodiments, the metal ion donor of the charge control agent complex is selected from a member of the group consisting of zinc nitrate hexahydrate, aluminum nitrate nonahydrate, and combinations thereof.

In embodiments, the charge control agent comprising a complex formed from a metal ion donor and at least one of a ligand selected from a member of the group consisting of a polyaromatic acid comprising humic acid, a pyranone based ligand, a furanone based ligand, or a combination thereof.

Any suitable or desired ligand can be selected. In embodiments, the ligand is selected from a member of the group consisting of a polyaromatic acid, in embodiments, humic acid, pyranone, furanone, and combinations thereof.

In certain embodiments, the ligand is selected from a member of the group consisting of dehydroacetic acid, humic acid, and combinations thereof.

In embodiments, the ligand comprises a pyranone and/or a furanone having a conjugated structure wherein the electrons are easily delocalized in the molecule.

Pyrone examples include hydroxypyrone, hydroxy (thio) pyrone, maltol, tert-butyl maltol, coumalic acid, tetracetic acid lactone, and chelidonic acid.

Furanone examples include 5-hydroxy-2 (5H)-furanone, 5-ethyl-4-hydroxy-2-methyl-3 (2H)-furanone, 2-methyl-3-furanthiol, and tetronic acid.

In certain embodiments, the ligand is selected from a member of the group consisting of hydroxy pyranone, thiopyranone, pyranone carboxylic acid, hydroxy furanone, thiofuranone, furanone carboxylic acid, and combinations thereof.

Any toner resin may be utilized in forming a toner of the present disclosure. Such resins, in turn, may be made of any suitable monomer or monomers via any suitable polymerization method. In embodiments, the resin is prepared by emulsion polymerization. In embodiments, the resin may be prepared by a method other than emulsion polymerization. In further embodiments, the resin may be prepared by condensation polymerization.

In embodiments, the emulsion aggregation toner comprises a toner particle having a core-shell structure. The toner particle core and shell can include any suitable or desired resin including the resins described herein. In certain embodiments, the particle core comprises at least one amorphous polyester, at least one crystalline polyester, an optional colorant, and an optional wax; and the particle shell comprises at least one amorphous polyester.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various melting points of, for example, from about 30° C. to about 120° C., in embodiments from about 75° C. to about 115° C., in embodiments from about 100° C. to about 110° C., or in embodiments from about 104° C. to about 108° C. As used herein, the low molecular weight amorphous polyester resin has, for example, a number average molecular weight (Mn), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight (Mw) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution (Mw/Mn) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly (co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

(I)

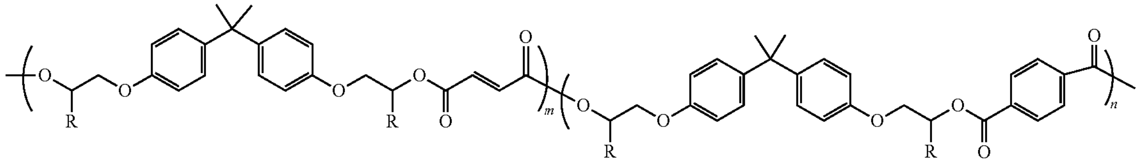

wherein R may be hydrogen or a methyl group, m and n represent random units of the copolymer, m may be from about 2 to 10, and n may be from about 2 to 10. Examples of such resins and processes for their production include those disclosed in U.S. Pat. No. 6,063,827, the disclosure of which is hereby incorporated by reference herein in its entirety.

An example of a linear propoxylated bisphenol A fumarate resin which may be utilized as a latex resin is available under the trade name SPARII™ from Resana S/A Industrias Quimicas, Sao Paulo Brazil. Other suitable linear resins include those disclosed in U.S. Pat. Nos. 4,533,614, 4,957,774, and 4,533,614, each of which is incorporated by reference herein in its entirety, which can be linear polyester resins including terephthalic acid, dodecylsuccinic acid, trimellitic acid, fumaric acid and alkyloxylated bisphenol A, such as, for example, bisphenol-A ethylene oxide adducts and bisphenol-A propylene oxide adducts. Other propoxylated bisphenol A terephthalate resins that may be utilized and are commercially available include GTU-FC115, commercially available from Kao Corporation, Japan, and the like.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-isophthalate, polypropylene-isophthalate, polybutylene-isophthalate, polypentylene-isophthalate, polyhexalene-isophthalate, polyheptadene-isophthalate, polyoctalene-isophthalate, polyethylene-sebacate, polybutylene-sebacate, polypropylene sebacate, polybutylene-adipate, polyethylene-adipate, polypropylene-adipate, polyheptadene-adipate, polyhexalene-adipate, polypentylene-adipate, polypropylene-glutarate, polyethylene-glutarate, polyoctalene-adipate, polyhexalene-glutarate, polypentylene-glutarate, polybutylene-glutarate, polyethylene-pimelate, polyoctalene-glutarate polyheptadene-glutarate, polybutylene-pimelate, polypentylene-pimelate, polypropylene-pimelate, polyhexalene-pimelate, polyheptadene-pimelate, poly(ethoxylated bisphenol A-fumarate), poly (ethoxylated bisphenol A-succinate), poly(ethoxylated bisphenol A-adipate), poly(ethoxylated bisphenol A-glutarate), poly(ethoxylated bisphenol A-terephthalate), poly (ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly (propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL® (Reichhold Inc.), ARAKOTE (Ciba-Geigy Corporation), HETRON™ (Ashland Chemical), PARAPLEX® (Rohm & Haas), POLYLITER (Reichhold Inc.), PLASTHALL® (Rohm & Haas), CELANEX® (Celanese Corporation), RYNITER (DuPont™), STYPOL® (Polynt Composites, Inc.), and combinations thereof. The resins can also be functionalized, such as carboxylated, sulfonated, or the like, and particularly such as sodio sulfonated, if desired.

The low molecular weight linear amorphous polyester resins are generally prepared by the polycondensation of an organic diol, a diacid or diester, and a polycondensation catalyst. The low molecular weight amorphous resin is generally present in the toner composition in various suitable amounts, such as from about 60 to about 90 weight percent, in embodiments from about 50 to about 65 weight percent, of the toner or of the solids.

Examples of organic diols selected for the preparation of low molecular weight resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of diacid or diesters selected for the preparation of the low molecular weight amorphous polyester include dicarboxylic acids or diesters such as terephthalic acid, phthalic acid, isophthalic acid, fumaric acid, maleic acid, itaconic acid, succinic acid, succinic anhydride, dodecylsuccinic acid, dodecylsuccinic anhydride, dodecenylsuccinic acid, dodecenylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester is selected, for example, in an amount of from about 45 to about 52 mole percent of the resin.

Examples of suitable polycondensation catalysts for either the low molecular weight amorphous polyester resin or the crystalline resin (described below) include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl) methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

The resulting unsaturated polyesters are reactive (for example, crosslinkable) on two fronts: (i) unsaturation sites (double bonds) along the polyester chain, and (ii) functional groups such as carboxyl, hydroxy, and the like, groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter, "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight (Mn), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The weight average molecular weight (Mw) of the resin is 50,000 or less, for example, from about 2,000 to about 50,000, in embodiments from about 3,000 to about 40,000, in embodiments from about 10,000 to about 30,000, and in embodiments from about 21,000 to about 24,000, as determined by GPC using polystyrene standards. The molecular weight distribution (Mw/Mn) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly (pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly (pentylene-dodecanedioate), poly(hexylene-dodecanedioate), poly(octylene-dodecanedioate), poly (nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly (5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylene-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated. In further embodiments, the crystalline polyester resin is a poly(dodecandioic acid-co-nonanediol).

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/0236446 and 2009/0047593, each of which is hereby incorporated by reference herein in their entirety. In embodiments, a suitable crystalline resin may include a resin composed of ethylene glycol or nonanediol and a mixture of dodecanedioic acid and fumaric acid co-monomers with the following formula (II):

(II)

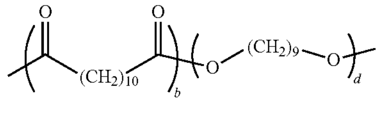

wherein b is from about 5 to about 2000, and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4,-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight (Mn), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight (Mw) of the resin is greater than 55,000, for example, from about 55,000 to about 150,000, in embodiments from about 60,000 to about 100,000, in embodiments from about 63,000 to about 94,000, and in embodiments from about 68,000 to about 85,000, as determined by GPC using polystyrene standard. The polydispersity index (PD) is above about 4, such as, for example, greater than about 4, in embodiments from about 4 to about 20, in embodiments from about 5 to about 10, and in embodiments from about 6 to about 8, as measured by GPC versus standard polystyrene reference resins. The PD index is the ratio of the weight-average molecular weight (Mw) and the number-average molecular weight (Mn). The low molecular weight amorphous polyester resins may have an acid value of from about 8 to about 20 mg KOH/g, in embodiments from about 9 to about 16 mg KOH/g, and in embodiments from about 11 to about 15 mg KOH/g. The high molecular weight amorphous polyester resins, which are available from a number of sources, can possess various melting points of, for example, from about 30° C. to about 140° C., in embodiments from about 75° C. to about 130° C., in embodiments from about 100° C. to about 125° C., and in embodiments from about 115° C. to about 121° C.

The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may be prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

Compositions containing modified polyester resins with a polybasic carboxylic acid which may be utilized in forming high molecular weight polyester resins include those disclosed in U.S. Pat. No. 3,681,106, as well as branched or cross-linked polyesters derived from polyvalent acids or alcohols as illustrated in U.S. Pat. Nos. 4,863,825; 4,863,824; 4,845,006; 5,143,809; 5,057,596; 4,988,794; 4,981,939; 4,980,448; 4,933,252; 4,931,370; 4,917,983, and 4,973,539, the disclosures of each of which are incorporated by reference herein in their entirety.

In embodiments, cross-linked polyesters resins may be made from linear amorphous polyester resins that contain sites of unsaturation that can react under free-radical conditions. Examples of such resins include those disclosed in U.S. Pat. Nos. 5,227,460; 5,376,494; 5,480,756; 5,500,324; 5,601,960; 5,629,121; 5,650,484; 5,750,909; 6,326,119; 6,358,657; 6,359,105; and 6,593,053, the disclosures of each of which are incorporated by reference herein in their entirety. In embodiments, suitable unsaturated polyester base resins may be prepared from diacids and/or anhydrides such as, for example, maleic anhydride, terephthalic acid, trimellitic acid, fumaric acid, and the like, and combinations thereof, and diols such as, for example, bisphenol-A ethylene oxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Such polyester resins may be formed from at least two pre-gel compositions including at least one polyol having two or more hydroxyl groups or esters thereof, at least one aliphatic or aromatic polyfunctional acid or ester thereof, or a mixture thereof having at least three functional groups; and optionally at least one long chain aliphatic carboxylic acid or ester thereof, or aromatic monocarboxylic acid or ester thereof, or mixtures thereof. The two components may be reacted to substantial completion in separate reactors to produce, in a first reactor, a first composition including a pre-gel having carboxyl end groups, and in a second reactor, a second composition including a pre-gel having hydroxyl end groups. The two compositions may then be mixed to create a cross-linked branched polyester high molecular weight resin. Examples of such polyesters and methods for their synthesis include those disclosed in U.S. Pat. No. 6,592,913, the disclosure of which is hereby incorporated by reference herein in its entirety.

Suitable polyols may contain from about 2 to about 100 carbon atoms and have at least two or more hydroxyl groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% by weight of the reaction mixture, in embodiments, from about 22% to about 26% by weight of the reaction mixture.

Aliphatic polyfunctional acids having at least two functional groups may include saturated and unsaturated acids containing from about 2 to about 100 carbon atoms, or esters thereof, in some embodiments, from about 4 to about 20 carbon atoms. Other aliphatic polyfunctional acids include malonic, succinic, tartaric, malic, citric, fumaric, glutaric, adipic, pimelic, sebacic, suberic, azelaic, sebacic, and the like, or mixtures thereof. Other aliphatic polyfunctional acids which may be utilized include dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid.

Aromatic polyfunctional acids having at least two functional groups which may be utilized include terephthalic, isophthalic, trimellitic, pyromellitic and naphthalene 1,4-, 2,3-, and 2,6-dicarboxylic acids.

The aliphatic polyfunctional acid or aromatic polyfunctional acid may be present in an amount of from about 40% to about 65% by weight of the reaction mixture, in embodiments, from about 44% to about 60% by weight of the reaction mixture.

Long chain aliphatic carboxylic acids or aromatic monocarboxylic acids may include those containing from about 12 to about 26 carbon atoms, or esters thereof, in embodiments, from about 14 to about 18 carbon atoms. Long chain aliphatic carboxylic acids may be saturated or unsaturated. Suitable saturated long chain aliphatic carboxylic acids may include lauric, myristic, palmitic, stearic, arachidic, cerotic, and the like, or combinations thereof. Suitable unsaturated long chain aliphatic carboxylic acids may include dodecylenic, palmitoleic, oleic, linoleic, linolenic, erucic, and the like, or combinations thereof. Aromatic monocarboxylic acids may include benzoic, naphthoic, and substituted naphthoic acids. Suitable substituted naphthoic acids may include naphthoic acids substituted with linear or branched alkyl groups containing from about 1 to about 6 carbon atoms such as 1-methyl-2 naphthoic acid and/or 2-isopropyl-1-naphthoic acid. The long chain aliphatic carboxylic acid or aromatic monocarboxylic acids may be present in an amount of from about 0% to about 70% weight of the reaction mixture, in embodiments, of from about 15% to about 30% weight of the reaction mixture.

Additional polyols, ionic species, oligomers, or derivatives thereof, may be used if desired. These additional glycols or polyols may be present in amounts of from about 0% to about 50% weight percent of the reaction mixture. Additional polyols or their derivatives thereof may include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate iso-butyrate and the like.

In embodiments, the cross-linked branched polyesters for the high molecular weight amorphous polyester resin may include those resulting from the reaction of dimethylterephthalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

The toner herein, in embodiments, the toner core herein, can comprise one or a combination of styrene-acrylate copolymers. In embodiments, the resin is selected from the group consisting of styrenes, acrylates, methacrylates, butadienes, isoprenes, acrylic acids, methacrylic acids, acrylonitriles, and combinations thereof.

Exemplary polymers that may be used for the toner resin include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly (alkyl methacrylate-aryl acrylate), poly(aryl methacrylate-alkyl acrylate), poly(alkyl methacrylate-acrylic acid), poly (styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly (ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly (styrene-propyl acrylate), poly(styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly (styrene-butyl acrylate-methacrylic acid), poly(styrene-butyl acrylate-acrylonitrile), poly(styrene-butyl acrylate-acrylonitrile-acrylic acid), poly(styrene-butadiene), poly (styrene-isoprene), poly(styrene-butyl methacrylate), poly (styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

In certain embodiments, the resin is selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylateisoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and combinations thereof.

In embodiments, resins, waxes, and other additives utilized to form toner compositions may be include and may be provided in the form of dispersions including surfactants. Moreover, toner particles may be formed by emulsion aggregation methods where the resin and other components of the toner are placed in one or more surfactants, an emulsion is formed, toner particles are aggregated, coalesced, the present charge control agent precipitated onto the toner surface during the wet portion of the process, the toner having the charge control agent thus disposed then optionally washed and dried, and recovered. Thus, in embodiments, the toner particles herein comprise emulsion aggregation toner particles.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants include polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxytheylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL® CA-210, IGEPALR CA-520, IGEPAL® CA-720, IGEPAL® CO-890, IGEPALR CO-720, IGEPALR CO-290, IGEPAL® CA-210, ANTAROX® 890 and ANTAROX® 897. An example of a suitable nonionic surfactant is ANTAROX® 897 available from Rhone-Poulenc Inc., which consists primarily of alkyl phenol ethoxylate. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be used include sulfates and sulfonates, sodium dodecylsulfate (SDS), sodium dodecyl benzene sulfonate, sodium dodecyl-naphthalene sulfate, dialkyl benzenealkyl sulfates and sulfonates, such as abietic acid, available from Aldrich, and the NEOGEN® brand of anionic surfactants. An example of a suitable anionic surfactant is NEOGEN® R, NEOGEN® RK, and NEOGEN® SC, available from Daiichi Kogyo Seiyaku co. Ltd., or TAYCA POWER BN2060 from Tayca Corporation (Japan), which consists primarily of branched sodium dodecyl benzene sulphonate. Other suitable anionic surfactants include, in embodiments, DOWFAX™ 2A1, an alkyldiphenyloxide disulfonate available from The Dow Chemical Company. Combinations of these surfactants may be used. Combinations of these surfactants and any of the foregoing anionic surfactants may be utilized in embodiments.

Examples of cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, and mixtures thereof. Specific examples include MIRAPOL® and ALKAQUAT® available from Alkaril Chemical Company, SANISOL® (benzalkonium chloride) available from Kao Chemicals, and the like. An example of a suitable cationic surfactant is SANISOL® B-50 available from Kao Corp., which consists primarily of benzyl dimethyl alkonium chloride. Mixtures of these and other surfactants may be utilized in embodiments.

The latex particles produced as described above may be added to a colorant to produce a toner. In embodiments the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330® magnetites; Mobay magnetites including MO8029™, M08060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180, and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

In certain embodiments, the colorant comprises black pigment, cyan pigment, or a combination thereof.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion (s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 4,000 to about 6,000 revolutions per minute. Homogenization may be accomplished by any suitable means, including, for example, an IKA ULTRA TURRAX® T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35° C. to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core. Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, 00-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy) hexane, t-butyl cumyl peroxide, α-α-bis (t-butyl peroxy) diisopropyl benzene, di-t-butyl peroxide and 2,5-dimethyl 2,5di(t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy) cyclohexane, 1,1-di(t-amyl peroxy) cyclohexane, 2,2-di(t-butyl peroxy) butane, ethyl 3,3-di(t-butyl peroxy) butyrate and ethyl 3,3-di(t-amyl peroxy) butyrate, and combinations thereof. Examples of suitable azo compounds include 2,2,'-azobis(2,4-dimethylpentane nitrile), azobis-isobutyronitrile, 2,2,-azobis (isobutyronitrile), 2,2,-azobis(2,4-dimethyl valeronitrile), 2,2'-azobis(methyl butyronitrile), 1,1'-azobis(cyano cyclohexane), other similar known compounds, and combinations thereof.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

A single polyester resin may be utilized as the shell or, as noted above, in embodiments a first polyester resin may be combined with other resins to form a shell. Multiple resins may be utilized in any suitable amounts. In embodiments, a first amorphous polyester resin, for example a low molecular weight amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments a second resin, in embodiments a high molecular weight amorphous resin, may be present in the shell resin in an amount of from about 0 percent by weight to about 80 percent by weight of the total shell resin, in embodiments from about 10 percent by weight to about 70 percent by weight of the shell resin.

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 rpm to about 400 rpm, in embodiments from about 200 rpm to about 300 rpm. The fused particles can be measured for shape factor or circularity, such as with a SYSMEX FPIA 3000 analyzer, until the desired shape is achieved.

Coalescence may be accomplished over a period of time from about 0.01 to about 9 hours, in embodiments from about 0.1 to about 4 hours.

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The process herein includes disposing a charge control agent as described herein. In embodiments, an emulsion aggregation toner process herein comprises: obtaining a latex of at least one resin; optionally, obtaining an aqueous dispersion of an optional colorant; optionally, obtaining an aqueous dispersion of an optional wax; forming a mixture of the latex of at least one resin, the aqueous dispersion of the optional colorant, and the aqueous dispersion of the optional wax; heating the mixture to a first temperature; maintaining the first temperature to form aggregated toner particles; adding a latex of shell resin to form a shell over the aggregated particles; optionally, adding a solution of a chelating agent; stopping further aggregation and raising the temperature to a second temperature that is higher than the first temperature to coalesce the aggregated particles forming coalesced toner particles; cooling, optionally washing, and optionally drying to form emulsion aggregation toner particles; precipitating a charge control agent onto a surface of the emulsion aggregation toner particles by adding a metal ion donor and at least one of a ligand selected from a member of the group consisting of a polyaromatic acid comprising humic acid, a pyranone based ligand, a furanone based ligand, or a combination thereof, to the emulsion aggregation toner particles, wherein the metal ion donor and ligand selected from a member of the group consisting of a polyaromatic acid comprising humic acid, a pyranone based ligand, a furanone based ligand, or a combination thereof, form the charge control agent, thus forming emulsion aggregation toner particles containing the charge control agent; and optionally, disposing a surface additive on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, the slurry may be passed through at least one heat exchanger to quench the temperature of the slurry after coalescence. After coalescence, the mixture may be quenched to below the glass transition temperature of the resin, such as a temperature below about 40° C. The cooling may be rapid or slow, as desired. A suitable cooling method may include introducing cold water to a jacket around at least one heat exchanger to quench.

Subsequently, the toner slurry may be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

In embodiments, the charge control agent herein is precipitated onto the emulsion aggregation toner particles after cooling, washing, and drying. In one embodiment, the charge control agent is precipitated onto the surface of the emulsion aggregation toner particles after cooling. In a specific embodiment, the charge control agent is precipitated onto the surface of the emulsion aggregation toner particles after drying. In a preferred embodiment, the prepared dried emulsion aggregation toner particles are redispersed, such as dispersed in water to form a toner slurry, and the charge control agent is precipitated onto a surface of the toner particles in the toner slurry. Thus, in embodiments, the emulsion aggregation toner process herein further comprises: dispersing dried emulsion aggregation toner particles in water to form a slurry of the emulsion aggregation toner particles, and precipitating the charge control agent onto a surface of the dispersed emulsion aggregation toner particles.

In embodiments, the process further comprises combining the emulsion aggregation toner particles with a toner carrier to form a developer.

In embodiments, toner particles herein my include optional additives in addition to the internal charge control agent described herein, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference herein in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

In certain embodiments, the emulsion aggregation toner herein, further comprises a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

Each of these external additives may be present in an amount from about 0 weight percent to about 3 weight percent of the toner, in embodiments from about 0.25 weight percent to about 2.5 weight percent of the toner, although the amount of additives can be outside of these ranges. In embodiments, the toners may include, for example, from about 0 weight percent to about 3 weight percent titania, from about 0 weight percent to about 3 weight percent silica, and from about 0 weight percent to about 3 weight percent zinc stearate.

In certain embodiment, the toner is free of, that is, does not contain, $TiO_2$ external additive.

In embodiments, toners of the present disclosure may be utilized as ultra-low melt (ULM) toners. In embodiments, the dry toner particles having a core and/or shell may, exclusive of external surface additives, have one or more the following characteristics:

(1) Volume average diameter (also referred to as "volume average particle diameter") of from about 3 to about 25 micrometers (μm), in embodiments from about 4 to about 15 μm, in other embodiments from about 5 to about 12 μm.

(2) Number Average Geometric Size Distribution (GSDn) and/or Volume Average Geometric Size Distribution (GSDv): In embodiments, the toner particles described in (1) above may have a narrow particle size distribution with a lower number ratio GSD of from about 1.15 to about 1.38, in other embodiments, less than about 1.31. The toner particles of the present disclosure may also have a size such that the upper GSD by volume in the range of from about 1.20 to about 3.20, in other embodiments, from about 1.26 to about 3.11. Volume average particle diameter D50V, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

(3) Circularity of from about 0.92 to about 0.99, in other embodiments, from about 0.94 to about 0.975. The instrument used to measure particle circularity may be an FPIA-3000 manufactured by SYSMEX, following the manufacturer's instructions.

The characteristics of the toner particles may be determined by any suitable technique and apparatus and are not limited to the instruments and techniques indicated hereinabove.

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 μm in size, in embodiments from about 50 to about 75 μm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

In embodiments, a developer herein comprises: an emulsion aggregation toner particle, and a toner carrier; wherein the emulsion aggregation toner particle comprises: at least one resin; an optional colorant; an optional wax; and a charge control agent disposed on a surface of the toner particle; wherein the charge control agent comprises a complex formed from a metal ion donor and a ligand as described herein.

The toners can be utilized for electrostatographic or electrophotographic processes. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be accomplished by heating the fused image to a temperature at which the toner resin will be crosslinked, for example in a post-fusing operation. In embodiments, crosslinking may be accomplished at temperatures of from about 160° C. or less, in embodiments from about 70° C. to about 160° C., in other embodiments from about 80° C. to about 140° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Polyester particle process. Emulsion aggregation toner particles were synthesized using the aggregation/coalescence method. Core polyester latexes, pigments, waxes, nitric acid, and a flocculent were homogenized and then aggregated in a reaction vessel with mixing at a temperature of about 46° C. At a target particle size (D50v) of about 5.3 micrometers, a mixture of shell polyester latex and nitric acid was added and the batch was held for a sufficient length of time to completely attach the latex to existing toner aggregates. The pH was then increased to about 7.8 using sodium hydroxide and ethylene diamine tetraacetic acid (EDTA) in order to halt the aggregation reaction. The batch temperature was then increased to 85° C. in order to coalesce the materials into particles of target circularity of 0.972. Lastly, the batch was passed through a heat exchanger in order to quickly cool the toner particles below 40° C. The resultant slurry was then washed and dried to yield toner parent particles.

TABLE 1

| Particle Formulation | Component | Black Amount (weight % in particle) |
|---|---|---|
| Particle Core | High MW Amorphous Polyester | 38.64 |

TABLE 1-continued

| Particle Formulation | Component | Black Amount (weight % in particle) |
|---|---|---|
| | Low MW Amorphous Polyester | 6.64 |
| | Crystalline Polyester | 6.72 |
| | Carbon Black | 6.00 |
| | Cyan Pigment | 1.00 |
| | Fischer Tropsch Wax | 9.00 |
| Particle Shell | Low MW Amorphous Polyester | 32.00 |
| Total Particle Weight Percent | | 100 |
| Other | Aluminum Sulphate | 0.50 pph |
| | EDTA | 1.50 pph |

High MW (molecular weight) amorphous polyester was prepared from an amorphous polyester resin in an emulsion, having an average molecular weight (Mw) of about 86,000, a number average molecular weight (Mn) of about 5,600, an onset glass transition temperature (Tg onset) of about 56° C., particle size approximately 70 nm (nanometers) and about 35% solids of composition terpoly-(propoxylated bisphenol A-terephthalate) terpoly-(propoxylated bisphenol A-dodecenylsuccinate) terpoly-(propoxylated bisphenol A fumarate).

Low MW amorphous polyester was prepared from an amorphous polyester resin in an emulsion having an Mw of about 19,400, an Mn of about 5,000, a Tg onset of about 60° C., particle size approximately 170-230 nm and about 35% solids of composition terpoly-(propoxylated bisphenol A-terephthalate) terpoly-(propoxylated bisphenol A-dodecenylsuccinate) terpoly-(propoxylated bisphenol A fumarate).

Crystalline polyester is a crystalline polyester resin comprising polyester made from dodecanedioic acid and 1,9-nonanediol.

Carbon black is a non-oxidized, low structure furnace black pigment.

Cyan pigment is C.I. Pigment Blue 15:3.

Fischer-Tropsch wax is a distilled synthetic polymethylene wax with a melting point of about 92° C.

EDTA is ethylene diamine tetra-acetic acid.

The parent particle formation procedure for all examples is as described above. All examples were prepared using the Fuji-mill blending procedure and the charge spectrograph analysis procedure described herein. The following examples use the same procedure but are distinguished by the type/amount of acid ligand and metal ion donor.

Toner formulation and blending. All toner samples were blended using a 750 milliliter bench blender (FujiMill) at 9600 rpm (revolutions per minute) for 9 minutes with 70 to 75 grams of black particle and an additive package comprising fumed $SiO_2$, colloidal $SiO_2$, strontium titanate, cerium oxide, and a wax for lubricating the photoreceptor. The blender was operating at 3 minutes on then 3 minutes off (3 times) to prevent the blend vessel from overheating and creating coarse particles.

Example 1

$Zn^{2+}$/dehydroacetic acid charge control agent deposited particle synthesis. In a representative synthesis, 80 grams of polyester particles as described above were slurried using 360 grams of water (with the help of a small amount of ethanol, about 20 grams) to approximate the particle during coalescence. 0.76 grams of an acid ligand, namely, sodium dehydroacetate, dissolved in 30 grams of water was slowly added to the toner particle slurry under stirring. The dispersion was kept stirring for 1 hour and then 0.59 grams of a metal ion source, namely, zinc nitrate hexahydrate, dissolved in 20 grams of water was added dropwise. The pH value of the resultant dispersion was adjusted to 6.5 using 0.3M $HNO_3$ and kept stirring for 1 hour. Subsequently, the dispersion was filtered, washed with 300 grams of water at pH of 6.5, and freeze dried to give the $Zn^{2+}$/dehydroacetic acid charge control agent deposited toner particles. The treated particles were blended using the Fuji-Mill in the manner described above. The resulting toner was evaluated for A zone peak q/d and J zone peak q/d for 5 sec, 10 sec, 15 sec, and 30 sec mix times, and the results are provided in Table 3 and Table 4.

Examples 2-8

Examples 2-8 were prepared in the manner of Example 1, except for the acid ligand and metal ion donor compounds and amounts used, according to Table 2.

The Examples were evaluated for A zone peak q/d and J zone peak q/d for 5 sec, 10 sec, 15 sec, and 30 sec mix times, and the results are provided in Table 3 and Table 4.

Comparative Example 9

Comparative Example 9 containing no internal charge control agent comprises the parent particle described above having an additive package comprising fumed $SiO_2$, colloidal $SiO_2$, strontium titanate, cerium oxide, and a wax for lubricating the photoreceptor but with no internal charge control agent. The untreated particles were blended using the Fuji-Mill in the manner described above. The resulting toner was evaluated for A zone peak q/d and J zone peak q/d for 5 sec, 10 sec, 15 sec, and 30 sec mix times, and the results are provided in Table 3 and Table 4.

TABLE 2

| Example | Acid Ligand/Amount (grams) | Metal Ion Donor/ (grams) | Amount |
|---|---|---|---|
| 1 | 0.76 g Sodium Dehydroacetate | 0.59 g Zinc Hexahydrate | Nitrate |
| 2 | 1.0 g Humic Acid | 0.53 g Zinc Hexahydrate | Nitrate |
| 3 | 1.0 g Humic Acid | 0.79 g Zinc Hexahydrate | Nitrate |
| 4 | 3.8 g Humic Acid | 1.5 g Zinc Hexahydrate | Nitrate |
| 5 | 0.76 g Sodium Dehydroacetate | 0.5 g Aluminum Nonahydrate | Nitrate |
| 6 | 1.0 g Humic Acid | 0.40 g Aluminum Nonahydrate | Nitrate |
| 7 | 1.0 g Humic Acid | 0.67 g Aluminum Nonahydrate | Nitrate |
| 8 | 3.8 g Humic Acid | 1.3 g Aluminium Nonahydrate | Nitrate |
| Comparative Ex. 9 | No CCA. | No CCA. | |

TABLE 3

| Example | 5 sec peak q/d A zone | 5 sec peak q/d J zone | 5 sec peak A/J | 30 sec peak q/d A zone | 30 sec peak q/d J zone | 30 sec peak A/J |
|---|---|---|---|---|---|---|
| 1 | −0.494 | −0.633 | 0.78 | −0.459 | −0.529 | 0.87 |
| 2 | −0.251 | −0.459 | 0.55 | −0.355 | −0.459 | 0.77 |
| 3 | −0.251 | −0.563 | 0.45 | −0.320 | −0.911 | 0.35 |
| 4 | −0.077, 0.096 | −0.355 | 0.22 | −0.112 | −0.425 | 0.26 |
| 5 | −0.529 | −0.876, −0.737 | 0.60 | −0.355 | −0.563 | 0.63 |
| 6 | −0.320 | −0.563 | 0.57 | −0.320 | −0.563 | 0.57 |
| 7 | −0.216 | −0.355, −0.598 | 0.61 | −0.251 | −0.355 | 0.71 |
| 8 | 0.061, −0.320 | −0.182 | −0.34 | −0.147 | −0.286 | 0.51 |
| Comparative Ex. 9 | −0.563 | −0.980, −0.563 | 0.57 | −0.598 | −0.772 | 0.77 |

TABLE 4

| Example | 5 sec width A zone | 5 sec % low charge A zone | 5 sec width J zone | 5 sec % low charge J zone |
|---|---|---|---|---|
| 1 | 1.354 | 0.52 | 1.076 | 0.30 |
| 2 | 0.625 | 5.67 | 0.833 | 0.51 |
| 3 | 0.729 | 11.73 | 1.007 | 1.49 |
| 4 | 0.903 | 46.68 | 0.868 | 8.51 |
| 5 | 1.423 | 0.90 | 1.631 | 2.45 |
| 6 | 0.660 | 5.60 | 0.937 | 1.06 |
| 7 | 0.660 | 13.00 | 1.076 | 1.35 |
| 8 | 0.764 | 34.19 | 0.660 | 22.72 |
| Comparative Ex. 9 | 0.729 | 0.16 | 1.076 | 0.41 |

Evaluation results. Each example was submitted for admix charge distribution using ferrite carrier at a concentration of 5% of the toner. In this procedure, a sample developer was made using 5 parts per hundred (pph) toner concentration wherein 5 parts of toner were included per 100 total parts of developer. After acclimation in both 80° F. and 80 percent relative humidity (RH) and 70° F. and 10 percent RH, the sample was mixed using a Turbula mixer run at 96 rpm for 10 minutes. The tribo was measured using a barbetta box and a charge spectrograph (CSG) smear was made at this 10 minute mark. A fresh toner sample of 2.5 pph was added to this same developer (Total TC=7.5 pph) and mixed for 5 seconds, 10 seconds, 15 seconds, and 30 second using the same mixing settings. At each mix time, a CSG smear was made to understand how the admix performance was at each of the four mix times. Each CSG smear is then converted into a chart of particle count plotted against q/d (charge per diameter, with units of fc/micrometer). The metrics in Table 3 and Table 4 were calculated from this data in order to provide a measure of the admix speed of the developer.

As shown in Tables 3 and 4, peak width is defined as the difference between the 98th and 2nd percentiles of the CSG, such that tails and outliers are excluded. % low charge is defined as the % of the CSG which is greater than-0.10 fc/micrometer and represents toner particle which would be expected to have difficulty developing properly. Peak q/d are local maxima of the CSG, excluding those which occur at the tails. This metric describes the magnitude of triboelectric charge capability for the toner. Peak A/J is the ratio of A zone peak q/d to J zone peak q/d and represents the toner's ability to charge consistently in various environmental conditions.

It is desirable to decrease 5 sec peak widths, increase A/J ratio toward 1, and minimize % low charge. Every example shows advantage in at least one area.

Figure 2:
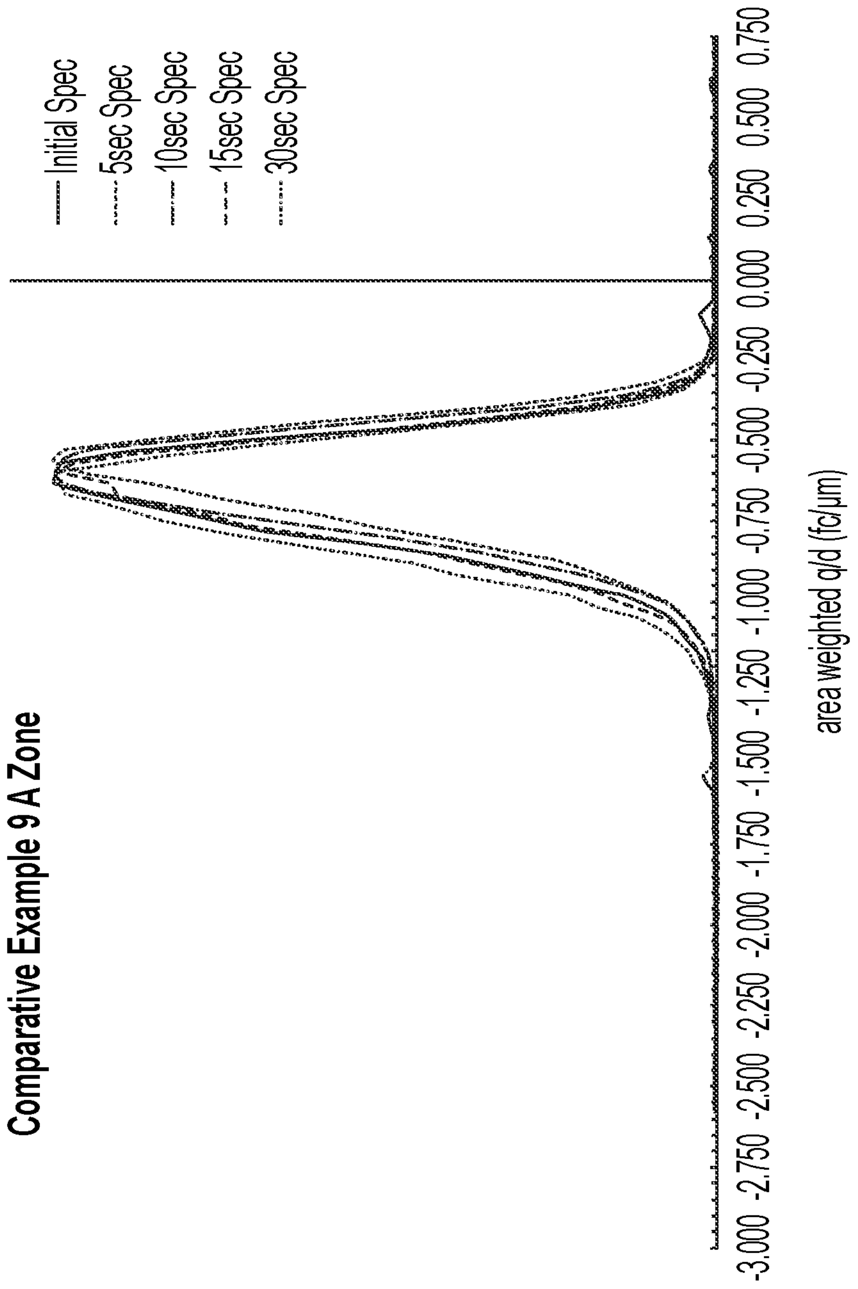
FIG. 2 is a charge spectrograph showing data for comparative particles in high humidity (A zone).

The CSG charts for lab scale particles without any CCA precipitation or $TiO_2$ additive are shown in FIG. 1 and FIG. 2. FIG. 1 shows a CSG for low humidity (J zone) of 10% RH at 21° C. for the particles of Comparative Example 9. FIG. 2 shows a CSG for high humidity (A zone) of 85% RH at 28° C. for the particles of Comparative Example 9. The solid lines in FIG. 1 and FIG. 2 are the distribution after the 10 minute mixing at 5 pph toner concentration (Initial Spec.) The dashed lines in FIG. 1 and FIG. 2 show the admix distribution after an additional 2.5 pph of fresh toner is added to the developer sample, measured at 5, 10, 15, and 30 seconds of additional mix time. The admix at the 5 second mix time of FIG. 1 shows a double peak with a short peak about −0.5 fC/μm (Femtocoulomb per micrometer). The subsequent mix times are more uniform, but the distribution width continues to get tighter as the mix time increases. This issue is normally solved with the addition of $TiO_2$ as an external additive during blending. The peak Q/d (toner charge in fC/μm) of the 30 second admix distribution is also an important critical parameter to look at, especially comparing low humidity (J zone) and high humidity (A zone). In this case, the A/J ratio is around 0.77 (30 sec peak Q/d in A zone divided by 30 sec peak Q/d in J zone). Ultimately, we are looking for the 30 second peaks to be the same for all humidity conditions (A zone/J zone=1.0) and the charge distribution width for all four admix times to be the same width as the initial charge distribution without any double peaks and have equal peak Q/d at all admix times.

Figure 3:
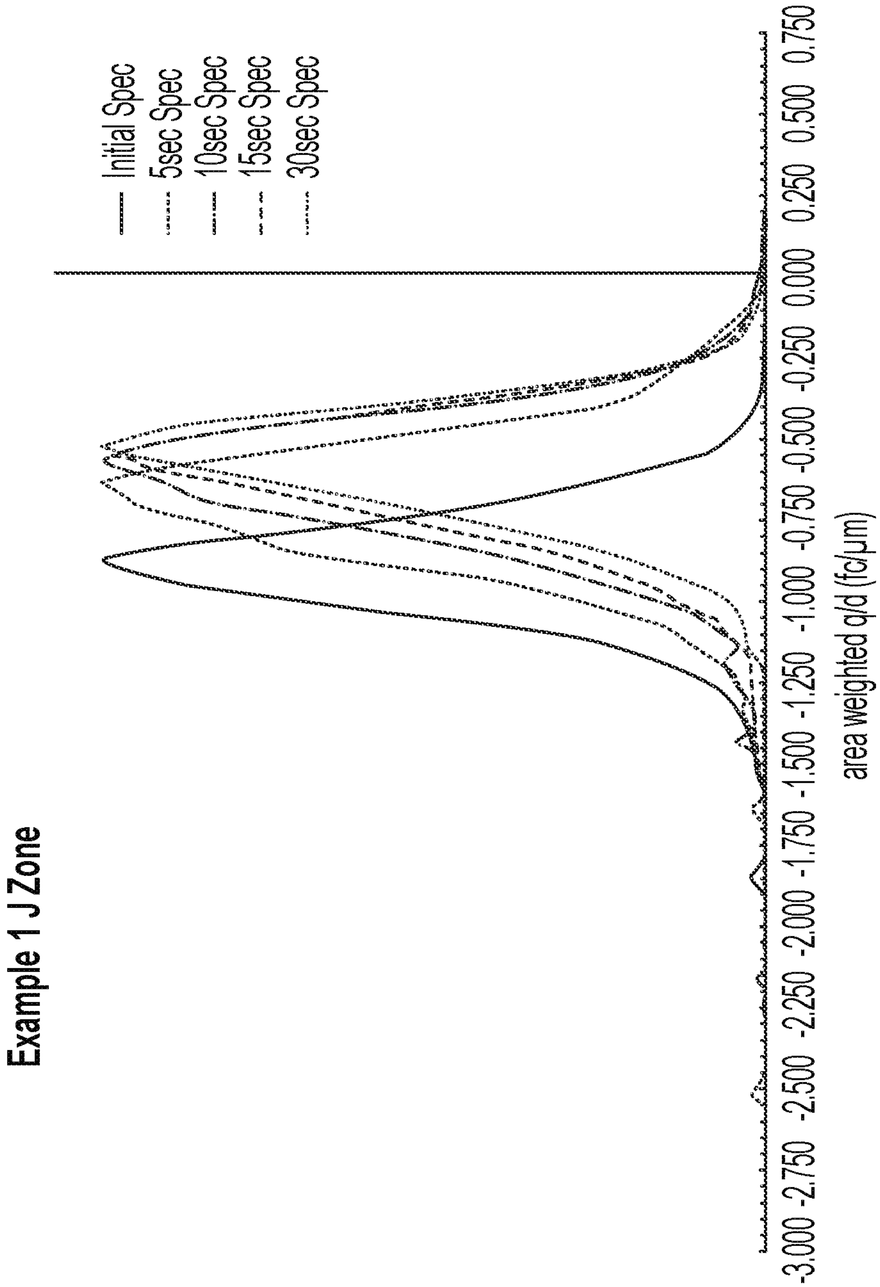
FIG. 3 is a charge spectrograph showing data for particles having $Zn^{2+}$/dehydroacetic acid charge control agent in accordance with the present embodiments in low humidity (J zone).
Figure 4:
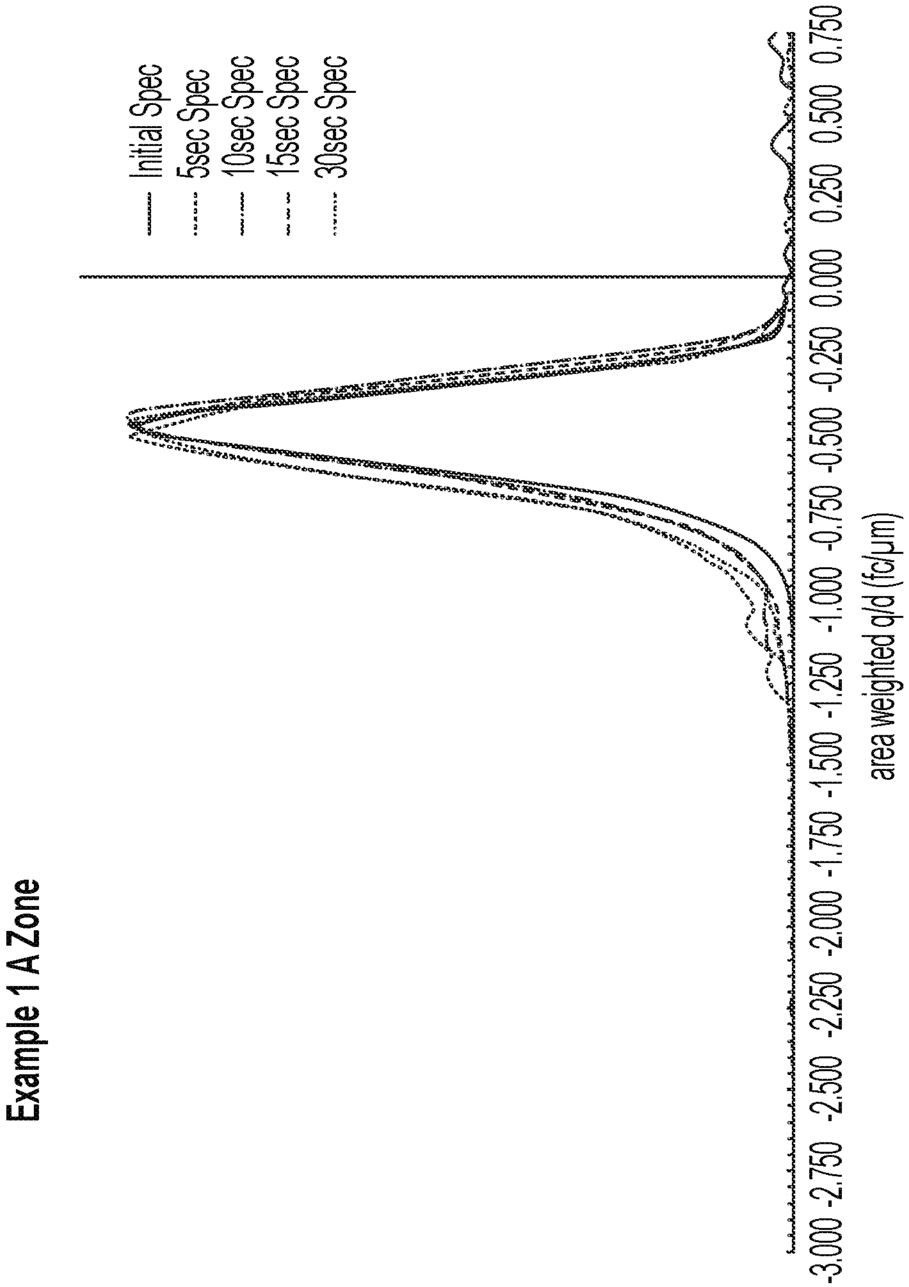
FIG. 4 is a charge spectrograph showing data for particles having $Zn^{2+}$/dehydroacetic acid charge control agent in accordance with the present embodiments in high humidity (A zone).

FIGS. 3 and 4 are CSG charts for Example 1 containing the CCA molecules with $Zn^{2+}$ ions and dehydroacetic acid that were precipitated using the procedure of the present embodiments. FIG. 3 shows a CSG for low humidity (J zone) of 10% RH at 21° C. for the particles of Example 1. FIG. 4 shows a CSG for high humidity (A zone) of 85% RH at 28° C. for the particles of Example 1.

The data for CCA Example 1 shows that both the % low charge and A/J ratio are improved over the control Comparative Example 9 that contains no CCA molecule. The A/J ratio for Example 1 was around 0.9, which is greatly improved over the control Comparative Example 9. In both environmental extremes, the amount of % low charger toner is minimal. The results show that the precipitation of CCA molecule containing $Zn^{2+}$ ions and dehydroacetic acid has a large beneficial impact on the admix speed and A/J ratio when precipitated after coalescence in the emulsion aggregation particle process.

At the low loading of zinc dehydroacetate CCA molecule (Example 1) both the admix speed and A/J ratio are improved (no double peaks) over the control Comparative Example 9 that contains no CCA molecule. Peak Q/d is stable by 10 seconds of admix time. The 30 sec A/J ratio for Example 1 was around 0.9, which is greatly improved over the control Comparative Example 9. In both environmental extremes, the amount of wrong sign and low charger toner is minimal. The results show that the precipitation of CCA molecule containing $Zn^{2+}$ ions and dehydroacetic acid has a large beneficial impact on the admix speed and A/J ratio when precipitated after coalescence in the emulsion aggregation particle process.

As can be seen in the low relative humidity charge spectrograph data of Examples 2, 3, and 4, the peak Q/d is reduced as the amount of zinc humate CCA molecule is increased. At the greatest loading amount (Example 4), the distribution becomes unstable and has an unacceptable amount of low charge and wrong sign toner, especially in high humidity. At the low loading of CCA molecule (Example 2), the admix speed is much improved over the control Comparative Example 9 that contains no CCA molecule, as shown by the decreased peak widths and the relatively low amounts of % low charge. This shows that the precipitation of CCA molecule containing $Zn^{2+}$ ions and humic complex is having a beneficial effect on the charge performance (charge speed and A/J ratio) when precipitated after coalescence in the emulsion aggregation particle process.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An emulsion aggregation toner comprising:

a toner particle comprising at least one resin; an optional colorant; an optional wax; and a charge control agent disposed on a surface of the toner particle;

the charge control agent comprising a complex formed from a metal ion donor and at least one of a ligand selected from a member of the group consisting of a polyaromatic acid comprising humic acid, a pyranone based ligand, a furanone based ligand, or a combination thereof.

2. The emulsion aggregation toner of claim 1, wherein the toner particle comprises a core shell structure; and wherein the charge control agent is disposed on a surface of the toner particle shell.

3. The emulsion aggregation toner of claim 1, wherein the metal ion donor of the charge control agent complex is selected from a member of the group consisting of a divalent calcium ion donor, a divalent magnesium ion donor, a divalent barium ion donor, a divalent zinc ion donor, a trivalent aluminum ion donor, a trivalent iron ion donor, a tetravalent titanium ion donor, a tetravalent zirconium ion donor, and combinations thereof.

4. The emulsion aggregation toner of claim 1, wherein the metal ion donor of the charge control agent complex is selected from a member of the group consisting of zinc nitrate, zinc acetate, zinc sulfate, zinc chloride, aluminum nitrate, aluminum acetate, aluminum sulfate, aluminum chloride, and combinations thereof.

5. The emulsion aggregation toner of claim 1, wherein the ligand is selected from a member of the group consisting of hydroxy pyranone, thiopyranone, pyranone carboxylic acid, hydroxy furanone, thiofuranone, furanone carboxylic acid, and combinations thereof.

6. The emulsion aggregation toner of claim 1, wherein the ligand is selected from a member of the group consisting of dehydroacetic acid, humic acid, and combinations thereof.

7. The emulsion aggregation toner of claim 1, wherein the toner is free of $TiO_2$.

8. The emulsion aggregation toner of claim 2, further comprising a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

9. A developer comprising:

an emulsion aggregation toner particle, and a toner carrier;

wherein the emulsion aggregation toner particle comprises: at least one resin; an optional colorant; an optional wax; and a charge control agent disposed on a surface of the toner particle;

wherein the charge control agent comprises a complex formed from a metal ion donor and at least one of a ligand selected from a member of the group consisting of a polyaromatic acid comprising humic acid, a pyranone based ligand, a furanone based ligand, or a combination thereof; and optionally, wherein the toner particle further comprises a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

10. The developer of claim 9, wherein the toner particle comprises a core shell structure; and wherein the charge control agent is disposed on a surface of the toner particle shell.

11. The developer of claim 9, wherein the metal ion donor of the charge control agent complex is selected from a member of the group consisting of a divalent calcium ion donor, a divalent magnesium ion donor, a divalent barium ion donor, a divalent zinc ion donor, a trivalent aluminum ion donor, a trivalent iron ion donor, a tetravalent titanium ion donor, a tetravalent zirconium ion donor, and combinations thereof; and wherein the ligand is selected from a member of the group consisting of hydroxy pyranone, thiopyranone, pyranone carboxylic acid, hydroxy furanone, thiofuranone, furanone carboxylic acid, and combinations thereof.

12. The developer of claim 9, wherein the metal ion donor of the charge control agent complex is selected from a member of the group consisting of zinc nitrate, zinc sulfate, zinc chloride, aluminum nitrate, aluminum sulfate, aluminum chloride, and combinations thereof; and wherein the ligand is selected from a member of the group consisting of dehydroacetic acid, humic acid, and combinations thereof.

13. The developer of claim 9, wherein the toner particle is free of $TiO_2$.

14. An emulsion aggregation toner process comprising:

obtaining a latex of at least one resin;

optionally, obtaining an aqueous dispersion of an optional colorant;

optionally, obtaining an aqueous dispersion of an optional wax;

forming a mixture of the latex of at least one resin, the aqueous dispersion of the optional colorant, and the aqueous dispersion of the optional wax;

heating the mixture to a first temperature;

maintaining the first temperature to form aggregated toner particles;

adding a latex of shell resin to form a shell over the aggregated particles;

optionally, adding a solution of a chelating agent;

stopping further aggregation and raising the temperature to a second temperature that is higher than the first temperature to coalesce the aggregated particles;

cooling, optionally washing, optionally drying, and recovering the emulsion aggregation toner particles;

precipitating a charge control agent onto a surface of the emulsion aggregation toner particles by adding a metal ion donor and at least one of a ligand selected from a member of the group consisting of a polyaromatic acid comprising humic acid, a pyranone based ligand, a furanone based ligand, or a combination thereof, to the emulsion aggregation toner particles, wherein the metal ion donor and polyaromatic acid comprising humic acid ligand, pyranone based ligand, furanone based ligand, or combination thereof, form the charge control agent, forming emulsion aggregation toner particles containing the internal charge control agent; and optionally, disposing a surface additive on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

15. The emulsion aggregation toner process of claim 14, further comprising:

combining the emulsion aggregation toner particles with a toner carrier to form a developer.

16. The emulsion aggregation toner process of claim 14, wherein the metal ion donor of the internal charge control agent complex is selected from a member of the group consisting of a divalent calcium ion donor, a divalent magnesium ion donor, a divalent barium ion donor, a divalent zinc ion donor, a trivalent aluminum ion donor, a trivalent iron ion donor, a tetravalent titanium ion donor, a tetravalent zirconium ion donor, and combinations thereof.

17. The emulsion aggregation toner process of claim 14, wherein the metal ion donor of the internal charge control agent complex is selected from a member of the group consisting of zinc nitrate, zinc sulfate, zinc chloride, aluminum nitrate, aluminum sulfate, aluminum chloride, and combinations thereof.

18. The emulsion aggregation toner process of claim 14, wherein the ligand is selected from a member of the group consisting of dehydroacetic acid, humic acid, and combinations thereof.

19. The emulsion aggregation toner process of claim 14, wherein the toner particle is free of $TiO_2$.

20. The emulsion aggregation toner process of claim 14, further comprising:

dispersing dried emulsion aggregation toner particles in water to form a slurry of the emulsion aggregation toner particles, and precipitating the charge control agent onto a surface of the dispersed emulsion aggregation toner particles.

21. An emulsion aggregation toner comprising:

a toner particle comprising at least one resin; an optional colorant; an optional wax; and a charge control agent disposed on a surface of the toner particle;

the charge control agent comprising a complex formed from a metal ion donor and at least one of a ligand selected from a member of the group consisting of hydroxy pyranone, thiopyranone, pyranone carboxylic acid, hydroxy furanone, thiofuranone, furanone carboxylic acid, and combinations thereof.

22. A developer comprising:

an emulsion aggregation toner particle, and a toner carrier;

wherein the emulsion aggregation toner particle comprises: at least one resin; an optional colorant; an optional wax; and a charge control agent disposed on a surface of the toner particle;

wherein the charge control agent comprises a complex formed from a metal ion donor selected from a member of the group consisting of a divalent calcium ion donor, a divalent magnesium ion donor, a divalent barium ion donor, a divalent zinc ion donor, a trivalent aluminum ion donor, a trivalent iron ion donor, a tetravalent titanium ion donor, a tetravalent zirconium ion donor, and combinations thereof, and at least one of a ligand selected from a member of the group consisting of hydroxy pyranone, thiopyranone, pyranone carboxylic acid, hydroxy furanone, thiofuranone, furanone carboxylic acid, and combinations thereof; and optionally, wherein the toner particle further comprises a surface additive disposed on a surface of the toner particle shell, wherein the surface additive is selected from a member of the group consisting of fumed silica, colloidal silica, polydimethylsiloxane treated silica, strontium titanate, cerium oxide, titanium dioxide, polydimethylsiloxane treated titanium dioxide, and combinations thereof.

23. The emulsion aggregation toner of claim 1, wherein the ligand is dehydroacetic acid; and wherein the metal ion donor of the charge control agent complex is selected from a member of the group consisting of zinc nitrate, zinc acetate, zinc sulfate, zinc chloride, and combinations thereof.

* * * * *